United States Patent
Kwon et al.

(10) Patent No.: US 9,350,176 B2
(45) Date of Patent: May 24, 2016

(54) SYSTEM AND METHOD FOR ALLOCATING COMMUNICATION ID FOR MULTI-BMS

(71) Applicant: LG CHEM, LTD., Seoul (KR)

(72) Inventors: Dong-Keun Kwon, Daejeon (KR); Jong-Min Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/768,698

(22) PCT Filed: Sep. 3, 2014

(86) PCT No.: PCT/KR2014/008272
§ 371 (c)(1),
(2) Date: Aug. 18, 2015

(87) PCT Pub. No.: WO2015/034262
PCT Pub. Date: Mar. 12, 2015

(65) Prior Publication Data
US 2016/0020622 A1   Jan. 21, 2016

(30) Foreign Application Priority Data

Sep. 9, 2013   (KR) .......................... 10-2013-0107960

(51) Int. Cl.
*H02J 7/00* (2006.01)
*H01M 10/42* (2006.01)
*H02J 7/04* (2006.01)

(52) U.S. Cl.
CPC .......... *H02J 7/0013* (2013.01); *H01M 10/425* (2013.01); *H01M 10/4257* (2013.01); *H02J 7/007* (2013.01); *H02J 7/04* (2013.01); *H01M 2010/4278* (2013.01)

(58) Field of Classification Search
CPC ................. H01M 10/4257; H01M 2010/4278
USPC .......................................................... 320/128
See application file for complete search history.

(56) References Cited

U.S. PATENT DOCUMENTS

| | | | |
|---|---|---|---|
| 2011/0003182 A1 | 1/2011 | Zhu | |
| 2011/0175574 A1 | 7/2011 | Sim et al. | |
| 2014/0091770 A1 | 4/2014 | Lee et al. | |
| 2014/0327403 A1* | 11/2014 | Yokoura | H01M 10/4207 320/128 |

FOREIGN PATENT DOCUMENTS

| | | |
|---|---|---|
| JP | 2002-353985 A | 12/2002 |
| KR | 10-2011-0013747 A | 2/2011 |
| KR | 10-2013-0058373 A | 6/2013 |
| KR | 10-2013-0079931 A | 7/2013 |
| KR | 10-2013-0095424 A | 8/2013 |

OTHER PUBLICATIONS

International Search Report issued in PCT/KR2014/008272, mailed on Jan. 2, 2015.
Written Opinion of the International Searching Authority issued in PCT/KR2014/008272, mailed on Jan. 2, 2015.

* cited by examiner

*Primary Examiner* — Yalkew Fantu
*Assistant Examiner* — Manuel Hernandez
(74) *Attorney, Agent, or Firm* — Birch, Stewart, Kolasch & Birch, LLP (57) ABSTRACT

The present disclosure discloses a system and method for allocating a communication identification (ID) associated with a position of a multi-battery management system (BMS). According to the system and method for allocating a communication ID according to the present disclosure, the communication ID associated with the position may be allocated to the multi-BMS quickly.

35 Claims, 3 Drawing Sheets

FIG. 3

SYSTEM AND METHOD FOR ALLOCATING COMMUNICATION ID FOR MULTI-BMS

TECHNICAL FIELD

The present disclosure relates to a system and method for allocating a communication identification (ID) to each battery management system (BMS) of a battery pack having a multi-BMS structure, and more particularly, to a system and method for allocating a communication ID associated with a position of a multi-BMS.

The present application claims priority to Korean Patent Application No. 10-2013-0107960 filed in the Republic of Korea on Sep. 9, 2013, the disclosures of which are incorporated herein by reference.

BACKGROUND ART

Due to its characteristics of being easily applicable to various products and electrical characteristics such as a high energy density, a secondary battery is not only commonly applied to a portable device, but universally applied to an electric vehicle (EV), a hybrid vehicle (HV), or an energy storage system that is propelled by an electric motor. This secondary battery is gaining attention for its primary advantage of remarkably reducing the use of fossil fuels and not generating by-products from the use of energy, making it a new eco-friendly and energy efficient source of energy.

A battery pack for use in electric vehicles has a structure comprising a plurality of cell assemblies connected in series, each cell assembly including a plurality of unit cells, to obtain high power. Also, the unit cell includes a cathode current collector and an anode current collector, a separator, an active material, and an electrolyte solution, and allows repeated charging and discharging by electrochemical reactions between the components.

In addition to this basic structure, the battery pack further includes a battery management system (BMS) to monitor and control a state of a secondary battery by applying an algorithm for control of power supply to a driving load such as a motor, measurement of electrical characteristic values such as current or voltage, charge/discharge control, voltage equalization control, state of charge (SOC) estimation, and the like.

Recently, with the increasing need for a high-capacity structure as well as utilization as an energy storage source, the demand for a battery pack of a multi-module structure in which a plurality of battery modules including a plurality of batteries connected in series and/or in parallel are assembled, is also increasing.

Because the battery pack of the multi-module structure includes a plurality of batteries, there is a limitation in controlling the charge/discharge state of all the batteries using a single BMS. Accordingly, a recent technology has been introduced in which a BMS is provided to each battery module included in the battery pack, one of the BMSs is designated as a master BMS, and the remaining BMSs are designated as slave BMS, such that the charge and discharge of each battery module is controlled in a master-slave mode.

In the master-slave mode, the master BMS communicates with the slave BMSs to collect various charge and discharge monitoring data associated with the battery modules for which the slave BMSs are responsible, or to transmit a control command to the corresponding slave BMS to control the charging/discharging operations of each battery module, so as to integratedly manage the charge and discharge of the battery modules included in the battery pack.

To collect data or transmit a control command through a communication network, the master BMS needs to pre-allocate an identification (ID) to each slave BMS to uniquely identify each slave BMS.

Existing methods are used by which a master BMS reads ID information pre-stored in a hardware circuit of a slave BMS, or a master BMS assigns an ID for each slave BMS by a program algorithm and transmits the IDs to each slave BMS. However, this traditional method has a disadvantage of requiring a separate hardware circuit for storing an ID.

As another related art, Korean Patent Laid-Open Publication No. 10-2013-0058373 discloses a method which wakes up multiple BMSs connected in series in a sequential order via a communication network and allocates IDs in a wake-up order. This related art has a drawback that a time required to allocate IDs increases with the increasing number of BMSs connected in series.

Accordingly, studies are actively being made on a system and method for allocating IDs to many BMSs quickly in a simple manner.

DISCLOSURE

Technical Problem

The present disclosure is designed to solve the problem of the related art, and therefore the present disclosure is directed to providing a system and method for allocating a communication identification (ID) associated with a position of a multi-battery management system (BMS).

Technical Solution

To achieve the object, a system for allocating a communication identification (ID) according to the present disclosure corresponds to a system that allocates a communication ID for a multi-battery management system (BMS) of a battery pack including N BMSs, in which N is an integer greater than or equal to 2, each having a vertical communication input port, a vertical communication output port, a horizontal communication input port, and a horizontal communication output port, a vertical communication network connecting the vertical communication input port and the vertical communication output port between adjacent BMSs among the N BMSs, and a horizontal communication network connecting the horizontal communication input port and the horizontal communication output port between adjacent BMSs among the N BMSs, wherein each BMS sets its communication ID by combining vertical communication ID information received through the vertical communication input port with horizontal communication ID information received through the horizontal communication input port, and transmits the vertical communication ID information through the vertical communication output port and the horizontal communication ID information through the horizontal communication output port.

According to one exemplary embodiment of the present disclosure, each BMS may set its communication ID by placing the vertical communication ID information received through the vertical communication input port in front of the horizontal communication ID information received through the horizontal communication input port.

According to another exemplary embodiment of the present disclosure, each BMS may set its communication ID by placing the horizontal communication ID information received through the horizontal communication input port in front of the vertical communication ID information received through the vertical communication input port.

According to one exemplary embodiment of the present disclosure, each BMS may increase a value of the vertical communication ID information received through the vertical communication input port and transmit it through the vertical communication output port, and may increase a value of the horizontal communication ID information received through the horizontal communication input port and transmit it through the horizontal communication output port. In this case, each BMS may set its communication ID without performing addition or subtraction on the values of the vertical communication ID information received through the vertical communication input port and the horizontal communication ID information received through the horizontal communication input port.

According to another exemplary embodiment of the present disclosure, each BMS may set its communication ID by increasing a value of the vertical communication ID information received through the vertical communication input port and increasing a value of the horizontal communication ID information received through the horizontal communication input port. In this case, each BMS may transmit a section related to the vertical communication ID information in its set communication ID through the vertical communication output port, and transmit a section related to the horizontal communication ID information in its set communication ID through the horizontal communication output port.

According to another exemplary embodiment of the present disclosure, each BMS may decrease a value of the vertical communication ID information received through the vertical communication input port and transmit it through the vertical communication output port, and may decrease a value of the horizontal communication ID information received through the horizontal communication input port and transmit it through the horizontal communication output port. In this case, each BMS may set its communication ID without performing addition or subtraction on the values of the vertical communication ID information received through the vertical communication input port and the horizontal communication ID information received through the horizontal communication input port.

According to another exemplary embodiment of the present disclosure, each BMS may set its communication ID by decreasing a value of the vertical communication ID information received through the vertical communication input port and decreasing a value of the horizontal communication ID information received through the horizontal communication input port. In this case, each BMS may transmit a section related to the vertical communication ID information in its set communication ID through the vertical communication output port, and transmit a section related to the horizontal communication ID information in its set communication ID through the horizontal communication output port.

The system for allocating a communication ID according to the present disclosure may further include a master BMS connected via the vertical communication network and the horizontal communication network to a BMS having a vertical communication input port and a horizontal communication input port not connected to other BMS among the N BMSs, in which N is an integer greater than or equal to 2.

The master BMS may output a control signal for initiating ID setting to the BMS connected via the vertical communication network and the horizontal communication network. Further, the master BMS may receive information associated with the communication IDs set by each BMS from the N BMSs, and inspect whether there is overlap in the communication IDs. When an overlap is found in the communication IDs received from the N BMSs, the master BMS may output a control signal for initiating ID setting to the BMS connected via the vertical communication network and the horizontal communication network. In contrast, when an overlap is not found in the communication IDs received from the N BMSs, the master BMS may output a control signal for terminating ID setting to the BMS connected via the vertical communication network and the horizontal communication network.

The vertical communication network and the horizontal communication network may be a daisy chain.

The system for allocating a communication ID according to the present disclosure may be one component of a battery pack including the system for allocating a communication ID.

The battery pack according to the present disclosure may be one component of a battery operating system including the battery pack and a load which is supplied with power from the battery pack. In this case, the load may be an electric driving means or a portable device.

To achieve the object, a method for allocating a communication ID according to the present disclosure corresponds to a method that allocates a communication ID for a multi-BMS of a battery pack including N BMSs, in which N is an integer greater than or equal to 2, each having a vertical communication input port, a vertical communication output port, a horizontal communication input port and a horizontal communication output port, a vertical communication network connecting the vertical communication input port and the vertical communication output port between adjacent BMSs among the N BMSs, and a horizontal communication network connecting the horizontal communication input port and the horizontal communication output port between adjacent BMSs among the N BMSs, and the method includes (a) setting, by each BMS, its communication ID by combining vertical communication ID information received through the vertical communication input port with horizontal communication ID information received through the horizontal communication input port, and (b) transmitting, by each BMS, the vertical communication ID information through the vertical communication output port and the horizontal communication ID information through the horizontal communication output port.

According to one exemplary embodiment of the present disclosure, the step (a) may include setting, by each BMS, its communication ID by placing the vertical communication ID information received through the vertical communication input port in front of the horizontal communication ID information received through the horizontal communication input port.

According to another exemplary embodiment of the present disclosure, the step (a) may include setting, by each BMS, its communication ID by placing the horizontal communication ID information received through the horizontal communication input port in front of the vertical communication ID information received through the vertical communication input port.

According to one exemplary embodiment of the present disclosure, the step (b) may include increasing, by each BMS, a value of the vertical communication ID information received through the vertical communication input port and transmitting it through the vertical communication output port, and increasing a value of the horizontal communication ID information received through the horizontal communication input port and transmitting it through the horizontal communication output port. In this case, the step (a) may include setting, by each BMS, its communication ID without performing addition or subtraction on the values of the vertical communication ID information received through the vertical communication input port and the horizontal communication ID information received through the horizontal communication input port.

According to another exemplary embodiment of the present disclosure, the step (a) may include setting, by each BMS, its communication ID by increasing a value of the vertical communication ID information received through the vertical communication input port and increasing a value of the horizontal communication ID information received through the horizontal communication input port. In this case, the step (b) may include transmitting, by each BMS, a section related to the vertical communication ID information in its set communication ID through the vertical communication output port, and transmitting a section related to the horizontal communication ID information in its set communication ID through the horizontal communication output port.

According to another exemplary embodiment of the present disclosure, the step (b) may include decreasing, by each BMS, a value of the vertical communication ID information received through the vertical communication input port and transmitting it through the vertical communication output port, and decreasing a value of the horizontal communication ID information received through the horizontal communication input port and transmitting it through the horizontal communication output port. In this case, the step (a) may include setting, by each BMS, its communication ID without performing addition or subtraction on the values of the vertical communication ID information received through the vertical communication input port and the horizontal communication ID information received through the horizontal communication input port.

According to another exemplary embodiment of the present disclosure, the step (a) may include setting, by each BMS, its communication ID by decreasing a value of the vertical communication ID information received through the vertical communication input port and decreasing a value of the horizontal communication ID information received through the horizontal communication input port. In this case, the step (b) may include transmitting, by each BMS, a section related to the vertical communication ID information in its set communication ID through the vertical communication output port, and transmitting a section related to the horizontal communication ID information in its set communication ID through the horizontal communication output port.

The method for allocating a communication ID according to the present disclosure may further include, before the step (a), outputting, by a master BMS connected via the vertical communication network and the horizontal communication network to a BMS having a vertical communication input port and a horizontal communication input port not connected to other BMS among the N BMSs in which N is an integer greater than or equal to 2, a control signal for initiating ID setting to the BMS connected via the vertical communication network and the horizontal communication network. Further, the method for allocating a communication ID according to the present disclosure may further include (c) receiving, by the master BMS, information associated with the communication IDs set by each BMS from the N BMSs, and inspecting whether there is overlap in the communication IDs. In this instance, the step (c) may further include outputting, by the master BMS, a control signal for initiating ID setting to the BMS connected via the vertical communication network and the horizontal communication network when an overlap is found in the communication IDs received from the N BMSs. In contrast, the step (c) may further include outputting, by the master BMS, a control signal for terminating ID setting to the BMS connected via the vertical communication network and the horizontal communication network when an overlap is not found in the communication IDs received from the N BMSs.

Advantageous Effects

According to one aspect of the present disclosure, a communication identification (ID) associated with a position may be quickly allocated to a multi-battery management system (BMS).

According to another aspect of the present disclosure, it is possible to intuitively infer a position of a BMS through a set ID.

BRIEF DESCRIPTION OF THE DRAWINGS

Other objects and aspects of the present disclosure will become apparent from the following descriptions of the embodiments with reference to the accompanying drawings in which.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
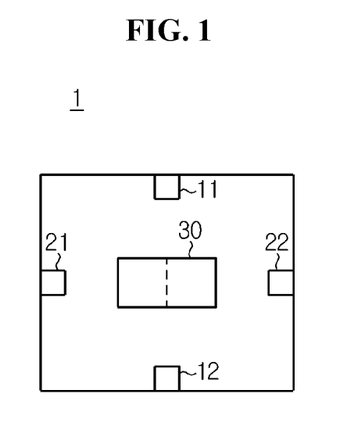
FIG. 1 is a diagram illustrating an architecture of a battery management system (BMS) according to the present disclosure.

FIG. 1 is a diagram illustrating an architecture of a battery management system (BMS) 1 according to the present disclosure.

Referring to FIG. 1, the BMS 1 according to the present disclosure has a vertical communication input port 11, a vertical communication output port 12, a horizontal communication input port 21, and a horizontal communication output port 22. The vertical communication input port 11 is connected to a vertical communication network 13 and configured to receive a signal. The vertical communication output port 12 is connected to the vertical communication network 13 and configured to transmit a signal. The horizontal communication input port 21 is connected to a horizontal communication network 23 and configured to receive a signal. The horizontal communication output port 22 is connected to the horizontal communication network 23 and configured to transmit a signal.

In the specification, the BMS 1 is an abbreviation for a battery management system. The BMS 1 may control at least one battery cell for which the BMS 1 is responsible, and in FIG. 1 and subsequent drawings, the battery cells which each BMS 1 serves to control are not illustrated. The control function of the BMS 1 may include various electrical and electronic control functions applicable at the level of the person having ordinary skill in the art (hereinafter referred to as 'those skilled in the art'), for example, charge/discharge control of the battery cells, equalization control, switching, measuring and monitoring of electrical characteristic values, error indication, ON/OFF control, state of charge (SOC) measurement, and the like.

To execute an algorithm for communication ID allocation to be described in detail later and control logic of the battery cell, the BMS 1 may include a processor, application-specific integrated circuit (ASIC), other chipsets, a logic circuit, a register, a communication modem, a data processing device, and the like, as known in the art pertaining to the present disclosure. Also, when the algorithm and the control logic are implemented as software, the BMS 1 may be implemented as an assembly of program modules. In this instance, the program module may be stored in the memory device and executed by the processor.

The BMS 1 has a memory device 30. The memory device 30 serves to store a communication identification (ID) being set. Information associated with a communication ID stored in the memory device 30 is indicated in the memory device 30 of the BMS 1 shown in FIG. 1, etc.

In the specification, the communication ID is used to identify a BMS or a slave BMS when the BMS 1 transmits and receives data to and from other BMS or, in a master-slave structure, when a master BMS transmits and receives data to and from a slave BMS.

The memory device may be inside or outside of the BMS 1, and may be connected to the BMS 1 with various well-known means. The memory device 30 is a high-capacity storage medium such as a semiconductor device or hard disk that is known as being capable of recording and erasing data, for example, random access memory (RAM), read-only memory (ROM), electrical erasable programmable read-only memory (EEPROM), and the like, and encompasses any device capable of storing information regardless of a device type and is not limited to a specific memory device.

Figure 2:
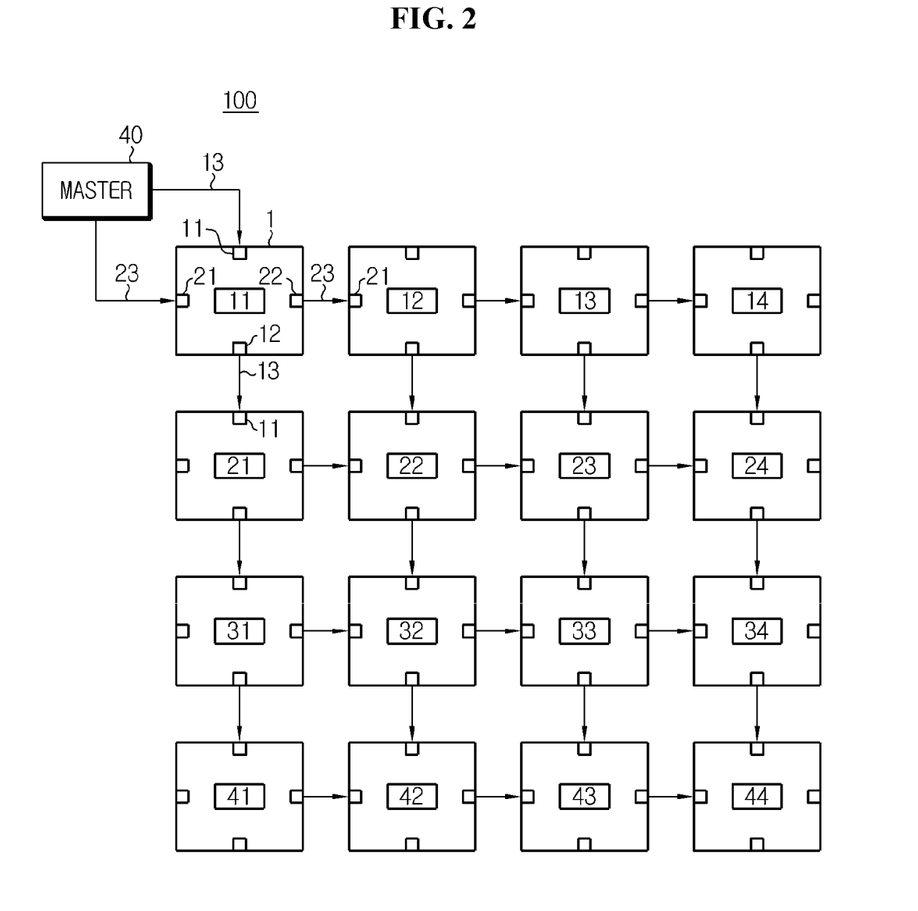
FIG. 2 is a block diagram schematically illustrating an architecture of a system for allocating a communication identification (ID) according to an exemplary embodiment of the present disclosure.

FIG. 2 is a block diagram schematically illustrating an architecture of a system for allocating a communication ID according to an exemplary embodiment of the present disclosure.

Referring to FIG. 2, the system 100 for allocating a communication ID according to the present disclosure includes N BMSs 1 in which N is an integer greater than or equal to 2.

The N BMSs 1 are connected to each other via the vertical communication network 13 connecting the vertical communication input port 11 and the vertical communication output port 12 between adjacent BMSs. Also, the N BMSs 1 are connected to each other via the horizontal communication network 23 connecting the horizontal communication input port 21 and the horizontal communication output port 22 between adjacent BMSs.

Each BMS 1 sets its communication ID by combining vertical communication ID information received through the vertical communication input port 11 with horizontal communication ID information received through the horizontal communication input port 21.

In the specification, the communication ID information represents fundamental information for setting the communication ID. The BMS 1 according to the present disclosure sets its communication ID using at least two pieces of communication ID information. A detailed description of an algorithm for setting the communication ID will be provided below.

The system 100 for allocating a communication ID according to the present disclosure may further include a master BMS 40 connected via the vertical communication network 13 and the horizontal communication network 23 to the BMS of which the vertical communication input port 11 and the horizontal communication input port 21 are not connected to other BMS among the N BMSs, in which N is an integer greater than or equal to 2. In FIG. 2, the BMS having the vertical communication input port 11 and the horizontal communication input port 21 not connected to other BMS is located at the left top. Thus, an exemplary embodiment in which the master BMS 40 is connected to the BMS 1 located at the left top is shown in FIG. 2.

According to an exemplary embodiment of the present disclosure, the master BMS 40 outputs a control signal for initiating ID setting to the BMS 1 connected via the vertical communication network 13 and the horizontal communication network 23.

For example, the master BMS 40 may output a signal '1' as the control signal for initiating ID setting to the vertical communication network 13 and a signal '1' to the horizontal communication network 23. In this instance, the signal '1' outputted to each of the vertical communication network 13 and the horizontal communication network 23 corresponds to the communication ID information according to the present disclosure.

The BMS 1 sets its communication ID by combining the vertical communication ID information '1' received from the master BMS 40 through the vertical communication input port 11 with the horizontal communication ID information '1' received through the horizontal communication input port 21.

According to an exemplary embodiment of the present disclosure, each BMS 1 sets its communication ID by placing the vertical communication ID information received through the vertical communication input port 11 in front of the horizontal communication ID information received through the horizontal communication input port 21. As shown in FIG. 2, the BMS 1 sets its communication ID as '11' and may store it in the memory device 30.

According to another exemplary embodiment of the present disclosure, each BMS 1 sets its communication ID by placing the horizontal communication ID information received through the horizontal communication input port 21 in front of the vertical communication ID information received through the vertical communication input port 11. For simplification of the drawings, the exemplary embodiment is not illustrated in a separate drawing.

The BMS 1 according to the present disclosure transmits the vertical communication ID information through the vertical communication output port 12 and the horizontal communication ID information through the horizontal communication output port 22.

According to an exemplary embodiment of the present disclosure, each BMS 1 increases a value of the vertical communication ID information received through the vertical communication input port 11 and transmits it through the vertical communication output port 12, and increases a value of the horizontal communication ID information received through the horizontal communication input port 21 and transmits it through the horizontal communication output port 22. Thus, in this case, each BMS 1 sets its communication ID without performing addition or subtraction on the values of the vertical communication ID information received through the vertical communication input port 11 and the horizontal communication ID information received through the horizontal communication input port 21.

Figure 3:
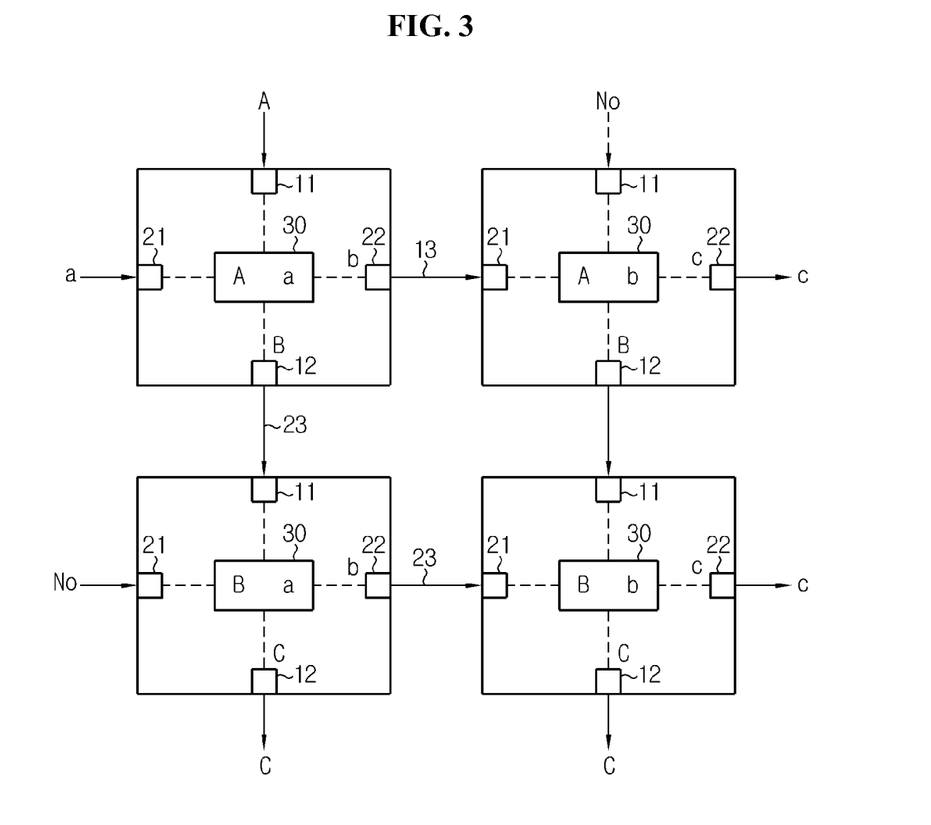
FIG. 3 is a reference diagram illustrating a method of setting a communication ID according to an exemplary embodiment of the present disclosure.

FIG. 3 is a reference diagram illustrating a method of setting a communication ID according to an exemplary embodiment of the present disclosure.

Referring to FIG. 3, 'A' as ID allocation information is inputted in the vertical communication input port 11 of the BMS located at the left top. Also, 'a' as ID allocation information is inputted in the horizontal communication input port 21 of the BMS located at the left top. Thus, the BMS located at the left top sets 'Aa' as its communication ID without performing addition or subtraction on values of the received horizontal communication ID information.

Also, the BMS located at the left top increases the value of the ID allocation information 'A' received through the vertical communication input port 11, and transmits 'B' through the vertical communication output port 12. At the same time, the BMS located at the left top increases the value of the ID allocation information 'a' received through the horizontal communication input port 21, and transmits 'b' through the horizontal communication output port 22.

Thus, 'B' as ID allocation information is inputted in the vertical communication input port 11 of the BMS located at the left bottom. Also, nothing as ID allocation information is inputted in the horizontal communication input port 21 of the BMS located at the left bottom. In this case, the BMS may recognize a basic value of the ID allocation information, i.e., 'a'. Thus, the BMS located at the left bottom sets 'Ba' as its communication ID without performing addition or subtraction on values of the received horizontal communication ID information.

Also, the BMS located at the left bottom increases the value of the ID allocation. information 'B' received through the vertical communication input port 11 and transmits 'C' through the vertical communication output port 12. At the same time, the BMS located at the left bottom increases the value of the ID allocation information 'a' and transmits 'b' through the horizontal communication output port 22.

On the other hand, nothing as ID allocation information is inputted in the vertical communication input port 11 of the BMS located at the right top. In this case, the BMS may recognize a basic value of ID allocation information, i.e., 'A'. Also, 'b' as ID allocation information is inputted in the horizontal communication input port 21 of the BMS located at the right top. Thus, the BMS located at the left bottom sets 'Ab' as its communication ID without performing addition or subtraction on values of the received horizontal communication ID information.

Also, the BMS located at the right top increases the value of the ID allocation information 'A' and transmits 'B' through the vertical communication output port 12. At the same time, the BMS located at the right top increases the value of the ID allocation information 'b' received through the horizontal communication input port 21 and transmits 'c' through the horizontal communication output port 22.

On the other hand, 'B' as ID allocation information is inputted in the vertical communication input port 11 of the BMS located at the right bottom. Also, 'b' as ID allocation information is inputted in the horizontal communication input port 21 of the BMS located at the right bottom. Thus, the BMS located at the right bottom sets 'Bb' as its communication ID without performing addition or subtraction on values of the received horizontal communication ID information.

Also, the BMS located at the right bottom increases the value of the ID allocation information 'B' received through the vertical communication input port 11 and transmits 'C' through the vertical communication output port 12. At the same time, the BMS located at the right bottom increases the value of the ID allocation information 'b' received through the horizontal communication input port 21 and transmits 'c' through the horizontal communication output port 22.

According to another exemplary embodiment of the present disclosure, each BMS 1 sets its communication ID by increasing the value of the vertical communication ID information received through the vertical communication input port 11 and increasing the value of the horizontal communication ID information received through the horizontal communication input port 21. Thus, in this case, each BMS 1 transmits a section related to the vertical communication ID information in its set communication ID through the vertical communication output port 12, and transmits a section related to the horizontal communication ID information in its set communication ID through the horizontal communication output port 22.

According to another exemplary embodiment of the present disclosure, each BMS 1 decreases the value of the vertical communication ID information received through the vertical communication input port 11 and transmits it through the vertical communication output port 12, and decreases the value of the horizontal communication ID information received through the horizontal communication input port 21 and transmits it through the horizontal communication output port 22. Thus, in this case, each BMS 1 sets its communication ID without performing addition or subtraction on the values of the vertical communication ID information received through the vertical communication input port 11 and the horizontal communication ID information received through the horizontal communication input port 21.

According to still another exemplary embodiment of the present disclosure, each BMS 1 sets its communication ID by decreasing the value of the vertical communication ID information received through the vertical communication input port 11 and decreasing the value of the horizontal communication ID information received through the horizontal communication input port 21. Thus, in this case, each BMS 1 transmits a section related to the vertical communication ID information in its set communication ID through the vertical communication output port 12, and transmits a section related to the horizontal communication ID information in its set communication ID through the horizontal communication output port 22.

Through the above-mentioned algorithm, the system 100 for allocating a communication ID according to the present disclosure may allocate communication IDs to the N BMSs without an overlapping communication ID.

According to an exemplary embodiment of the present disclosure, the master BMS 40 receives the information associated with the communication ID set by each BMS 1 from the N BMSs, and inspects whether there is overlap in the communication IDs. When an overlap is found in the communication IDs received from the N BMSs, the master BMS 40 may output a control signal for initiating ID setting to the BMS connected via the vertical communication network 13 and the horizontal communication network 23. In contrast, when an overlap is not found in the communication IDs received from the N BMSs, the master BMS 40 may output a control signal for terminating ID setting to the BMS connected via the vertical communication network 13 and the horizontal communication network 23.

If the N BMSs are able to transmit the information associated with the communication IDs set by the master BMS 40 via the vertical communication network 13 and the horizontal communication network 23, transmission via a separate communication network is possible.

According to an exemplary embodiment of the present disclosure, the vertical communication network 13 and the horizontal communication network 23 are a daisy chain. The daisy chain is a known communication technology to those skilled in the art, and its detailed description is omitted herein.

The system 100 for allocating a communication ID according to the present disclosure may be one component of a battery pack (not shown) including the system 100 for allocating a communication ID. Also, the battery pack may be one component of a battery operating system (not shown) including the battery pack and a load which is supplied with power from the battery pack. The battery operating system may include, for example, an electric vehicle (EV), a hybrid vehicle (HEV), an electric bike (E-Bike), a power tool, an energy storage system, an uninterruptible power supply (UPS), a portable computer, a mobile phone, a portable audio device, a portable video device, and the like, and the load may include, for example, a motor that generates a rotational force by power supplied from the battery pack, or a power inverter circuit that inverts power supplied from the battery pack to power required for various circuit components.

In the description of the present disclosure, it should be understood that each element of the present disclosure shown in FIGS. 1 through 3 is distinguished logically rather than physically.

That is, each element corresponds to a logic element to realize the technical spirit of the present disclosure, and accordingly, even though each element is integrated or separated, it should be construed as falling within the scope of the present disclosure if a function performed by a logic element of the present disclosure can be implemented, and it should be understood that it falls within the scope of the present disclosure regardless of whether names are identical or not if it is an element performing an identical or similar function.

While the present disclosure has been hereinabove described in connection with only a limited number of embodiments and drawings, the present disclosure is not limited thereto and it should be understood that various changes and modifications may be made by an ordinary person skilled in the art within the spirit and scope of the disclosure and the appended claims and their equivalents.

What is claimed is:

1. A system for allocating a communication identification (ID) for a multi-battery management system (BMS) of a battery pack, the system comprising:
  N BMSs, in which N is an integer greater than or equal to 2, each having a vertical communication input port, a vertical communication output port, a horizontal communication input port, and a horizontal communication output port;
  a vertical communication network connecting the vertical communication input port and the vertical communication output port between adjacent BMSs among the N BMSs; and
  a horizontal communication network connecting the horizontal communication input port and the horizontal communication output port between adjacent BMSs among the N BMSs,
  wherein each BMS sets its communication ID by combining vertical communication ID information received through the vertical communication input port with horizontal communication ID information received through the horizontal communication input port, and transmits the vertical communication ID information through the vertical communication output port and the horizontal communication ID information through the horizontal communication output port.

2. The system for allocating a communication ID according to claim 1, wherein each BMS sets its communication ID by placing the vertical communication ID information received through the vertical communication input port in front of the horizontal communication ID information received through the horizontal communication input port.

3. The system for allocating a communication ID according to claim 1, wherein each BMS sets its communication ID by placing the horizontal communication ID information received through the horizontal communication input port in front of the vertical communication ID information received through the vertical communication input port.

4. The system for allocating a communication ID according to claim 1, wherein each BMS increases a value of the vertical communication ID information received through the vertical communication input port and transmits it through the vertical communication output port, and increases a value of the horizontal communication ID information received through the horizontal communication input port and transmits it through the horizontal communication output port.

5. The system for allocating a communication ID according to claim 4, wherein each BMS sets its communication ID without performing addition or subtraction on the values of the vertical communication ID information received through the vertical communication input port and the horizontal communication ID information received through the horizontal communication input port.

6. The system for allocating a communication ID according to claim 1, wherein each BMS sets its communication ID by increasing a value of the vertical communication ID information received through the vertical communication input port and increasing a value of the horizontal communication ID information received through the horizontal communication input port.

7. The system for allocating a communication ID according to claim 6, wherein each BMS transmits a section related to the vertical communication ID information in its set communication ID through the vertical communication output port, and transmits a section related to the horizontal communication ID information in its set communication ID through the horizontal communication output port.

8. The system for allocating a communication ID according to claim 1, wherein each BMS decreases a value of the vertical communication ID information received through the vertical communication input port and transmits it through the vertical communication output port, and decreases a value of the horizontal communication ID information received through the horizontal communication input port and transmits it through the horizontal communication output port.

9. The system for allocating a communication ID according to claim 8, wherein each BMS sets its communication ID without performing addition or subtraction on the values of the vertical communication ID information received through the vertical communication input port and the horizontal communication ID information received through the horizontal communication input port.

10. The system for allocating a communication ID according to claim 1, wherein each BMS sets its communication ID by decreasing a value of the vertical communication ID information received through the vertical communication input port and decreasing a value of the horizontal communication ID information received through the horizontal communication input port.

11. The system for allocating a communication ID according to claim 10, wherein each BMS transmits a section related to the vertical communication ID information in its set communication ID through the vertical communication output port, and transmits a section related to the horizontal communication ID information in its set communication ID through the horizontal communication output port.

12. The system for allocating a communication ID according to claim 1, further comprising:
a master BMS connected via the vertical communication network and the horizontal communication network to a BMS having a vertical communication input port and a horizontal communication input port not connected to other BMS among the N BMSs, in which N is an integer greater than or equal to 2.

13. The system for allocating a communication ID according to claim 12, wherein the master BMS outputs a control signal for initiating ID setting to the BMS connected via the vertical communication network and the horizontal communication network.

14. The system for allocating a communication ID according to claim 12, wherein the master BMS receives information associated with the communication IDs set by each BMS from the N BMSs, and inspects whether there is overlap in the communication IDs.

15. The system for allocating a communication ID according to claim 14, wherein the master BMS outputs a control signal for initiating ID setting to the BMS connected via the vertical communication network and the horizontal communication network when an overlap is found in the communication IDs received from the N BMSs.

16. The system for allocating a communication ID according to claim 14, wherein the master BMS outputs a control signal for terminating ID setting to the BMS connected via the vertical communication network and the horizontal communication network when an overlap is not found in the communication IDs received from the N BMSs.

17. The system for allocating a communication ID according to claim 1, wherein the vertical communication network and the horizontal communication network are a daisy chain.

18. A battery pack comprising:
a system for allocating a communication ID according to claim 1.

19. A battery operating system comprising:
a battery pack according to claim 18; and
a load which is supplied with power from the battery pack.

20. The battery operating system according to claim 19, wherein the load is an electric driving means or a portable device.

21. A method for allocating a communication identification (ID) for a multi-battery management system (BMS) of a battery pack comprising N BMSs, in which N is an integer greater than or equal to 2, each having a vertical communication input port, a vertical communication output port, a horizontal communication input port and a horizontal communication output port, a vertical communication network connecting the vertical communication input port and the vertical communication output port between adjacent BMSs among the N BMSs, and a horizontal communication network connecting the horizontal communication input port and the horizontal communication output port between adjacent BMSs among the N BMSs,
the method comprising:
(a) setting, by each BMS, its communication ID by combining vertical communication ID information received through the vertical communication input port with horizontal communication ID information received through the horizontal communication input port; and
(b) transmitting, by each BMS, the vertical communication ID information through the vertical communication output port and the horizontal communication ID information through the horizontal communication output port.

22. The method for allocating a communication ID according to claim 21, wherein the step (a) comprises setting, by each BMS, its communication ID by placing the vertical communication ID information received through the vertical communication input port in front of the horizontal communication ID information received through the horizontal communication input port.

23. The method for allocating a communication ID according to claim 21, wherein the step (a) comprises setting, by each BMS, its communication ID by placing the horizontal communication ID information received through the horizontal communication input port in front of the vertical communication ID information received through the vertical communication input port.

24. The method for allocating a communication ID according to claim 21, wherein the step (b) comprises increasing, by each BMS, a value of the vertical communication ID information received through the vertical communication input port and transmitting it through the vertical communication output port, and increasing a value of the horizontal communication ID information received through the horizontal communication input port and transmitting it through the horizontal communication output port.

25. The method for allocating a communication ID according to claim 24, wherein the step (a) comprises setting, by each BMS, its communication ID without performing addition or subtraction on the values of the vertical communication ID information received through the vertical communication input port and the horizontal communication ID information received through the horizontal communication input port.

26. The method for allocating a communication ID according to claim 21, wherein the step (a) comprises setting, by each BMS, its communication ID by increasing a value of the vertical communication ID information received through the vertical communication input port and increasing a value of the horizontal communication ID information received through the horizontal communication input port.

27. The method for allocating a communication ID according to claim 26, wherein the step (b) comprises transmitting, by each BMS, a section related to the vertical communication ID information in its set communication ID through the vertical communication output port, and transmitting a section related to the horizontal communication ID information in its set communication ID through the horizontal communication output port.

28. The method for allocating a communication ID according to claim 21, wherein the step (b) comprises decreasing, by each BMS, a value of the vertical communication ID information received through the vertical communication input port and transmitting it through the vertical communication output port, and decreasing a value of the horizontal communication ID information received through the horizontal communication input port and transmitting it through the horizontal communication output port.

29. The method for allocating a communication ID according to claim 28, wherein the step (a) comprises setting, by each BMS, its communication ID without performing addition or subtraction on the values of the vertical communication ID information received through the vertical communication input port and the horizontal communication ID information received through the horizontal communication input port.

30. The method for allocating a communication ID according to claim 21, wherein the step (a) comprises setting, by each BMS, its communication ID by decreasing a value of the vertical communication ID information received through the vertical communication input port and decreasing a value of the horizontal communication ID information received through the horizontal communication input port.

31. The method for allocating a communication ID according to claim 30, wherein the step (b) comprises transmitting, by each BMS, a section related to the vertical communication ID information in its set communication ID through the vertical communication output port, and transmitting a section related to the horizontal communication ID information in its set communication ID through the horizontal communication output port.

32. The method for allocating a communication ID according to claim 21, further comprising:
before the step (a),
outputting, by a master BMS connected via the vertical communication network and the horizontal communication network to a BMS having a vertical communication input port and a horizontal communication input port not connected to other BMS among the N BMSs in which N is an integer greater than or equal to 2, a control signal for initiating ID setting to the BMS connected via the vertical communication network and the horizontal communication network.

33. The method for allocating a communication ID according to claim 32, further comprising:
(c) receiving, by the master BMS, information associated with the communication IDs set by each BMS from the N BMSs, and inspecting whether there is overlap in the communication IDs.

34. The method for allocating a communication ID according to claim 33, wherein the step (c) further comprises outputting, by the master BMS, a control signal for initiating ID setting to the BMS connected via the vertical communication network and the horizontal communication network when an overlap is found in the communication IDs received from the N BMSs.

35. The method for allocating a communication ID according to claim 33, wherein the step (c) further comprises outputting, by the master BMS, a control signal for terminating ID setting to the BMS connected via the vertical communication network and the horizontal communication network when an overlap is not found in the communication IDs received from the N BMSs.

* * * * *